Aug. 20, 1935.  O. V. KRUSE  2,011,641
FREE DISCHARGE VALVE
Filed July 6, 1931  3 Sheets-Sheet 1
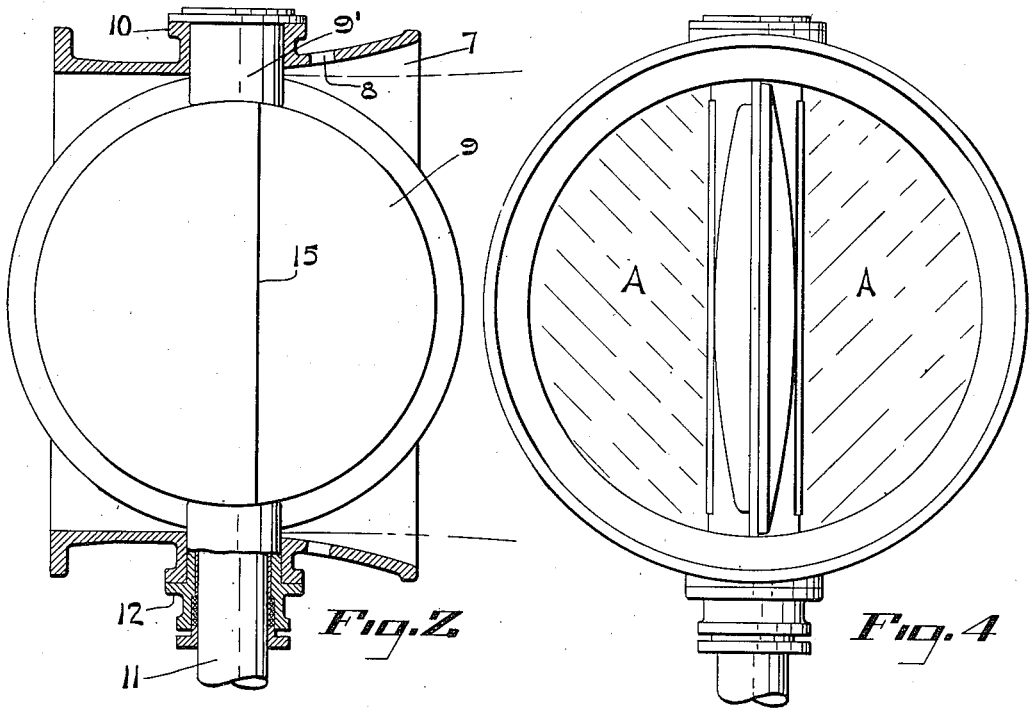
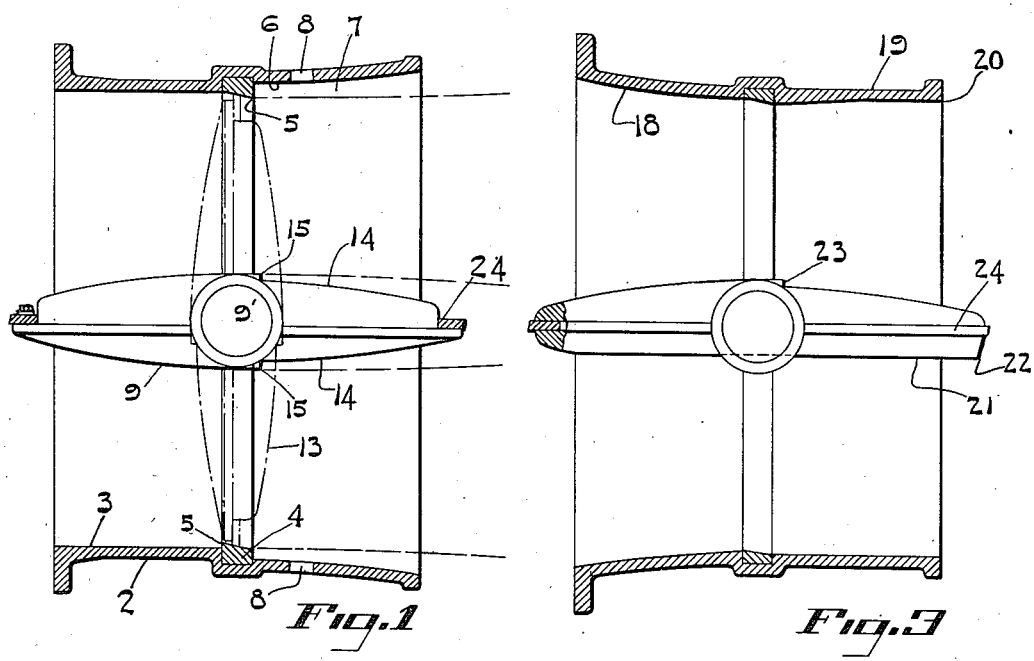
INVENTOR
BY O. V. Kruse
Edward M. Hathaway
ATTORNEY Aug. 20, 1935. O. V. KRUSE 2,011,641
FREE DISCHARGE VALVE
Filed July 6, 1931 3 Sheets-Sheet 2

INVENTOR
O. V. Kruse
BY
Edward Hathaway
ATTORNEY

Aug. 20, 1935. O. V. KRUSE 2,011,641
FREE DISCHARGE VALVE
Filed July 6, 1931 3 Sheets-Sheet 3

INVENTOR
O. V. Kruse
BY
Edward Hathaway
ATTORNEY

Patented Aug. 20, 1935

2,011,641

UNITED STATES PATENT OFFICE 2,011,641

FREE DISCHARGE VALVE

Otto V. Kruse, St. Davids, Pa., assignor, by mesne assignments, to Baldwin-Southwark Corporation, a corporation of Delaware Application July 6, 1931, Serial No. 548,929

9 Claims. (Cl. 299—138)

This invention relates generally to valves and more particularly to an improved free discharge valve especially of the butterfly type although as shown herein other types of valves may also be employed.

A free discharge valve is usually employed in dams where it is desired to discharge water from the reservoir for purposes of irrigation, or of controlling the level of the water in the reservoir, or of discharging water into a river bed downstream of the dam in order to conduct water to a point further downstream or for various other purposes. In each case however the water discharges freely from the valve, usually into the atmosphere, and under its full spouting velocity. Such conditions if not properly controlled will cause cavitation and corrosion of the valve and create disturbing vibrations which may result in damage to the valve and its surrounding structure with probability that the valve will be completely wrecked and thus cause serious injury to person and property.

There are certain conditions in handling the flow of water from a reservoir or pipe line where an inexpensive type of valve, such as butterfly valve, can be used to advantage. The usual form of valve for such purposes is a needle type, more particularly that known as the Larner-Johnson valve. The needle type valve is useful for controlling the flow and for remaining stationary an indefinite period at some intermediate position of its opening stroke. The butterfly valve, for example, is not so suitable for partly open positions but it may be satisfactorily operated either in the tight-shut position or in wide-open position. Such intermediate positions of a butterfly valve in handling water discharging under spouting velocity are not desirable due to the tendency of the valve to erode and it may even vibrate for such intermediate positions.

Even with a butterfly valve in full open position similar destructive conditions may exist as above mentioned so that it is the purpose of my present invention to adapt these less expensive types of valves for free discharge operation while at the same time properly controlling or eliminating any disturbing conditions. One object of my invention is to accomplish this by providing an improved valve construction employing the principle that the discharge jet or jets will leave the valve structure at a definite point which is created preferably by having the surfaces of the valve break quickly away from the line of flow.

A further object of this invention is to provide an improved arrangement, particularly for a butterfly type of valve, whereby there will be no tendency for the valve disc or its casing to cavitate or erode. In one aspect of the invention this is accomplished by arranging the valve disc and casing so as to provide comparatively sharp breaks on the valve surfaces in such a manner that air may flow to, or be present immediately adjacent, these surfaces either due to the inherent characteristic of the arrangement or through the provision of suitable means for conducting the flow of air to adjacent surfaces thereby preventing formation of a vacuum which is the chief cause of cavitation. In the most specific aspect of the invention as applied to a butterfly type of valve the valve disc and casing are provided with sharp edges at the point where the discharge jet or jets leave the surfaces, this being employed in combination with a passage arrangement for the admission of air up to these breaks.

Other objects and advantages of the invention will be more apparent to those skilled in the art from the following description of the accompanying drawings in which:

Fig. 1 is a section taken at right angles to the axis of the butterfly valve with the valve disc shown in elevation;

Fig. 2 is a section taken axially of the valve disc in open position, the disc being shown in elevation;

Fig. 3 is a modified form of valve disc and casing which is shown in a section transverse to the axis of the valve disc;

Fig. 4 is an end view of the valve shown in Fig. 2;

Figure 5:
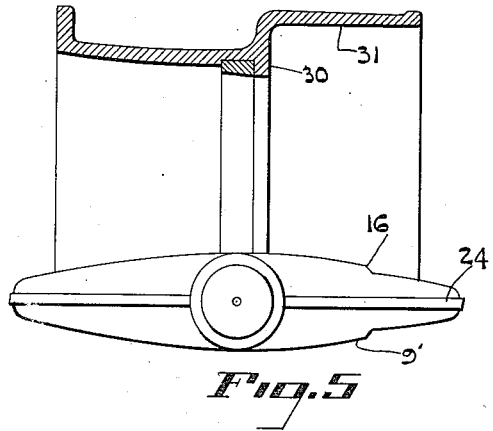
Fig. 5 is a further modification of the casing and of a modified location of the breaking surface on the valve disc, only half of the casing being shown.

In the illustrated embodiment of the invention as shown in Fig. 1 a valve body 2 of generally circular cross-section is provided with suitable flanges adapted for connection to a pipe line or to be suitably imbedded if desired in the concrete dam structure or for otherwise being supported to the dam. This valve casing has a substantially straight cylindrical inner periphery at its entrance 3 terminating in a suitable recess for receiving a seat 4 which is preferably removable and constructed of any usual material employed for seats of this nature, such as rubber, special metals or the like. The casing can of course be made in sections to facilitate manufacturing and if desired instead of providing a removable seat 4 the casing wall itself may be used as the seat. In any case, however, either the seat or the casing wall is provided with a sharply breaking edge 5 of sufficiently acute angle with respect to the direction of flow that the flow lines will sharply depart or separate from the valve seat or valve surface. In the specific form of the invention as shown in Fig. 1 the valve seat itself is arranged to present this sharply breaking surface by materially offsetting the downstream portion 6 of the valve casing. Preferably the valve casing is offset substantially adjacent the seat 5 and gradually flares outwardly so as to provide an ample annular space 7 through which air may easily flow up to the sharply breaking edge 5 thereby breaking or preventing any vacuum adjacent thereto. If desired further openings or ports 8 may be provided at either uniform or irregularly spaced points around the circumference of the valve casing.

Certain general features of the valve disc are preferably the same as employed in usual butterfly valves, for instance, the valve disc 9 is supported by a trunnion 9' journalled in a closed bearing 10 while an operating shaft 11 supports the diametrically opposite point of the valve disc and is journalled in a suitably packed bearing 12. Any suitable means may be employed for rotating the valve to its full open position as shown in Fig. 1 or to its closed position as shown in dotted lines at 13.

In the ordinary type of butterfly valve the disc is usually symmetrical and purposely designed with the object in view of having the water follow and adhere to the gradually curved surfaces of the valve disc, thereby attempting to attain smooth flow lines over the entire valve surface. However, in actual practice and especially with free discharge valves it is impossible to obtain flow lines which smoothly follow the entire surface of the valve disc. The result is that the water departs from the valve surface in such a manner that a vacuum is formed which in the course of time causes cavitation or erosion of the valve disc surfaces at those departing areas.

In the improved arrangement of my invention I positively insure and compel a separation of the flow from the disc in such a manner as to reduce to a minimum the destructive conditions which cause cavitation. Breaking edges 15 on the valve are provided preferably by offsetting the downstream faces 14 on each side of the valve disc, the offset being made by the provision of acute shoulders preferably at right angles to the disc surface. The shoulder may of course assume any suitable vertical outline but preferably for the sake of simplicity of manufacturing, the shoulder is a straight line such as shown in Fig. 1, this line extending across the entire diameter of the disc. While the shoulders have been shown adjacent the axis of the disc it will of course be understood that these shoulders might be placed at any suitable position downstream from the valve axis so long as the flow is caused to break sharply away from the valve surface and air is permitted to enter. Such a downstream position is shown in Fig. 5 at 16. This figure also shows the breaking shoulder as being inclined instead of at right angles to the surface, it being understood however that the degree of inclination is determined in accordance with the necessity for causing the water to break sharply away from the surface. If desired in the Fig. 5 modification the shoulder 16 instead of being along a straight line such as 15 shown in Fig. 2 it may be along an arcuate line whose ends terminate adjacent the valve disc pivot shafts 9' and 11, thereby insuring that the water will be separated across the entire diameter of the valve although under certain conditions the shoulder 16 might be along a straight line, thereby permitting a small portion of the valve diameter not to be provided with a breaksurface. However, the unprovided surface would be relatively small in comparison to the provided portion and accordingly would prevent cavitation over a material portion of the valve.

In any of the forms of the butterfly valves in wide open position, it is seen that the flow therethrough will be divided, as shown in the shaded areas A in Fig. 4, into two lens-shaped jets having approximately a circular form on the outside conforming to the breaking edges or surfaces 5 and approximately a straight flat surface on the inside conforming to edges 15. Air flows in between the jets as through the passages 7 and ports 8 and thence to the breaking surfaces. It is thus seen that there is a free access of air to all sides of the discharging jets of water and to the breaking surfaces, and hence there is no tendency for the discharging jets to form a vacuum on any surface of the valve structure.

In the modification shown in Fig. 3 the upstream or inlet side of the valve casing is preferably gradually tapered as at 18 while the discharge side has a substantially straight cylindrical inner wall terminating in a sharp edge 20 which performs the function of the breaking edge. The valve disc may be of the types shown and described in connection with Fig. 1 wherein breaking surfaces are provided on each side of the valve or it may have a straight side as indicated at 21, thereby automatically terminating in a sharp downstream breaking edge 22, this edge of course being semi-circular as it defines the downstream portion of the valve periphery. The upstream peripheral edge of this side of the valve may be slightly rounded to permit smooth flow lines as the water enters the valve structure. The other side of the valve, however, may be bulged outwardly so as to give sufficient strength to the valve in which case it is preferable to provide a breaking edge 23 similar to the forms described in connection with Fig. 1. It will of course be understood that this form of valve disc may be used in connection with the downstream type of casing structure shown at 6 in Fig. 1 or it may be employed with the casing as shown with its Fig. 3 casing. Air from the outside of the valve will flow to the breaking surface 23 or the corresponding surface 15, if used, by passing between the two separated jets A. Where the flat surface 21 is employed it may be flat over its entire surface or if desired it may be very slightly bulged near its central portion but not to such an extent as to prevent full functioning of the breaking edge 22.

In the two forms described, and in any other forms, the valve discs are preferably provided with renewable peripheral seats 24 which are clamped in a peripheral recess in the valve disc although any other usual type of sealing device may be employed on the disc periphery.

Figure 6:
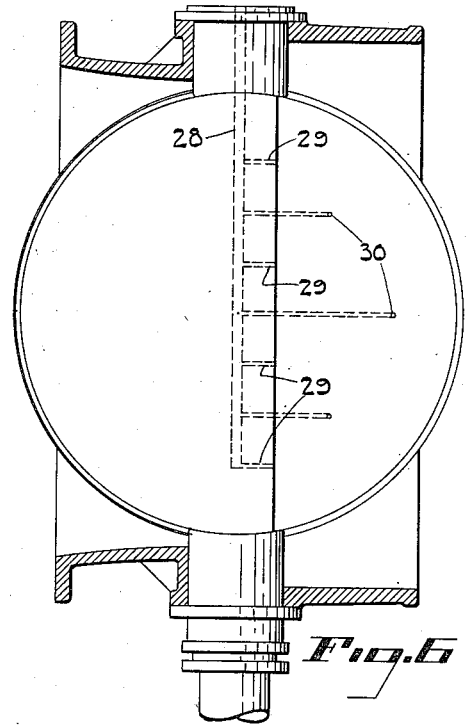
Fig. 6 is a modified form of means which may be employed with any of the butterfly valves for admitting air to the breaking surfaces.

The modification illustrated in Fig. 6 is adapted to be applied to any of the forms shown due to the provision of means for directing air to the breaking surfaces as through a passage or passages 28 in the valve disc shaft. This passage or passages may have outlets 29 disposed at various points of the breaking surface and extending through the surface of the shoulder which forms the breaking edge. If desired supplemental passages such as 30 may be provided to admit air over the various portions of the valve surface, thereby insuring maximum elimination of cavitation.

In the form of the invention shown in Fig. 3 wherein the valve is provided with a flat surface, it is seen that the valve may be turned to a part gate position thereby insuring the flow to break sharply away from the edge 22, it being assumed that the valve is moved in a clockwise direction. With the other constructions, part gate operation might cause an irregular breaking away from the upstream shoulder and thus possibly cause cavitation if the valve is operated in part gate position for an extended period of time.

In the modifications shown in Fig. 5 the valve casing is abruptly offset at 30 adjacent the valve seat. If desired, of course, the annular portion 31 may be eliminated although this would permit the valve disc to project outwardly from the valve casing and be wholly unprotected.

Figures 10, 11:
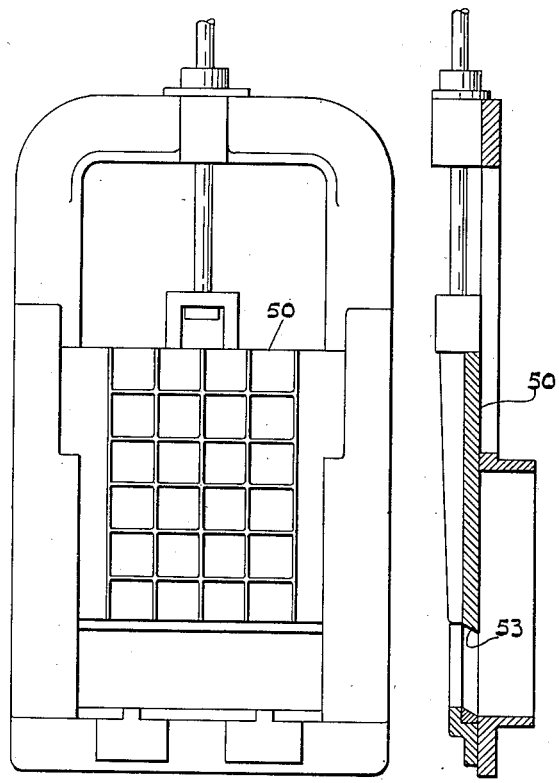
Figs. 10 and 11 are respectively a front elevation and a section of my invention applied to a sluice gate.

The modification of Figs. 10 and 11 shows my invention as applied to a sluice gate wherein the gate 50 is suitably guided in usual channel or angle irons imbedded in concrete. The lower edge of the movable gate element is sharply tapered in either direction in a manner similar to that shown with the gate valves of Figs. 7 and 8 thereby providing a sharply breaking edge. To provide similar breaking edges around the perimeter of the opening the edges are all tapered as at 53 to effect the sharply breaking edge.

Figure 12:
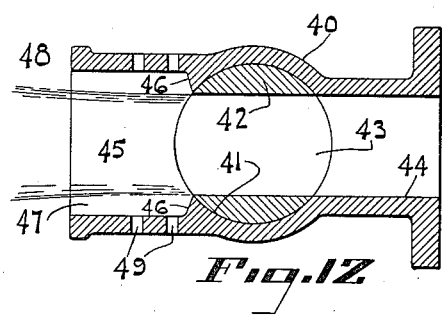
Fig. 12 is a section of a plug valve incorporating my invention therein, the section being taken transversely of the axis of rotation of the movable valve element.

The modification of Fig. 12 shows a so-called plug type of valve with the principles of my invention embodied therein so as to avoid cavitation of the valve parts when the valve is in wide open position to serve as a free discharge valve. As shown the valve casing 40 is provided with suitable end flanges, a flow passage therethrough and a transverse bore 41 of either conical, straight, cylindrical or spherical form in which a similarly shaped valve element 42 is rotatably disposed and provided with a transverse opening 43 which when in full open position will have its sides substantially flush with the sides of the inlet 44. The discharge side 45 of the valve is provided with sharply breaking surfaces 46 which extend axially of the rotatable valve element 42 and provide an offset in the discharge side of the valve of sufficient lateral extent and abruptness so that the water in issuing from the passage 43 will sharply depart from the guiding surfaces in the form of a free jet. This free jet is rendered fully possible by admission of air through the passage 47 which is formed between the walls of the discharge side 45 and the jet which is generally indicated at 48. The supply of air may if desired be supplemented by a series of ports 49. It will of course be understood that the sharply breaking surfaces 46 extend across the top and bottom of the valve as well as axially thereof thereby insuring a sharply breaking edge around the entire orifice formed preferably in the valve body as shown although the body could be cut back immediately adjacent the edges of opening 43 on its downstream side to permit the downstream edges of the rotatable element to serve as the breaking edge when the valve is in full open position. The rotatable valve element is of course suitably journalled in the valve body and as is usual in this general type of valve the rotatable element may be axially removed through the top of the valve casing which has a cover through which the valve operating stem extends.

Figure 7:
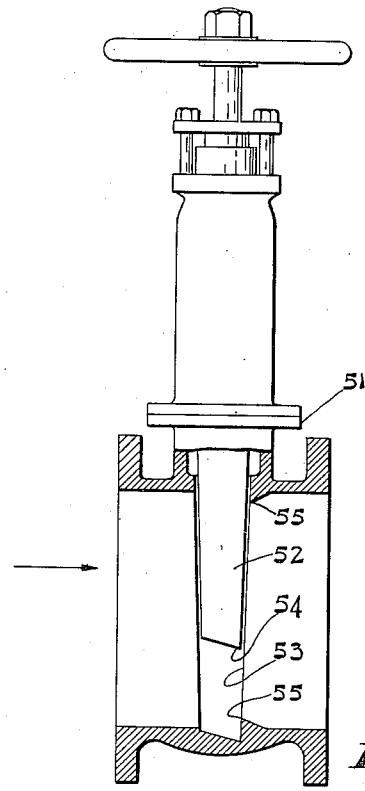
Figs. 7, 8 and 9 are further modifications showing my invention as applied to a gate valve.
Figure 9:
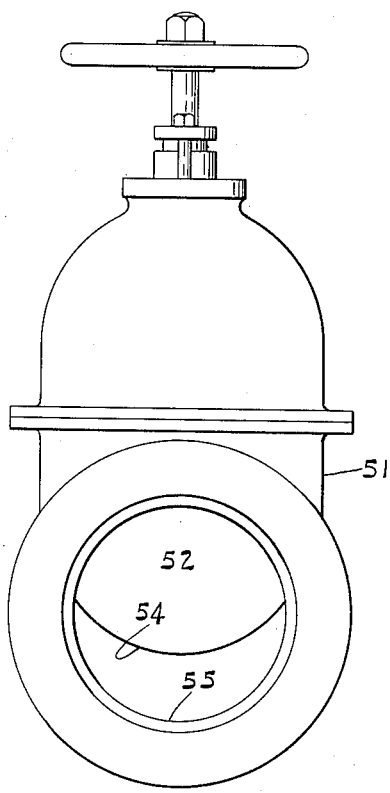
Figure 8:
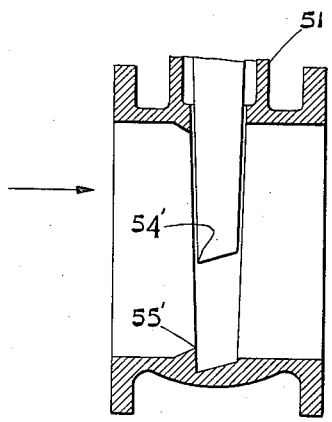

Figs. 7–9 illustrate the invention as applied to a gate valve 51 having a valve element 52 adapted to be moved by suitable actuating means, herein a handwheel and threaded valve stem. The valve element is guided and seated in grooves 53 transversely of the valve passage so as to variably control flow therethrough. To insure desirable free discharge functioning of the valve the movable element has an inclined lower end terminating in a sharp edge 54 while the valve body has a sharp inwardly extending lip 55 disposed entirely around the inner surface of the valve passage so that for either part gate or full open position the jet will discharge freely of the valve. While the valve passage is shown as circular in cross-section and the lower edge of the valve element is similarly shaped, it will of course be understood that any other suitable or desirable shape may be employed. Also, as shown in Fig. 9, the breaking edges 54' and 55' may be disposed on the upstream side of the valve.

It will of course be understood that various changes may be made in construction and arrangement of parts and the principles of my invention may be applied to various other types of valves without departing from the spirit of the invention as set forth in the appended claims.

I claim:

1. The combination in a free discharge valve mechanism comprising, a valve body provided with a discharge passage, a valve element movable to control flow of fluid through said passage, means whereby flow through said discharge passage breaks sharply from said valve element along a line contact which extends substantially entirely across the surface of said valve element in a direction transverse of the flow, and means whereby flow through said discharge passage breaks sharply from the walls thereof along a line contact which extends substantially entirely around the inner surface of said passage.

2. The combination in a free discharge valve mechanism comprising, a valve body provided with a discharge passage, a valve element movable to control flow of fluid through said passage, means whereby when the valve is in wide open position the flow through said discharge passage breaks sharply from said valve element along a line contact which extends substantially entirely across the surface of said valve element in a direction transverse of the flow, and means whereby flow through said discharge passage breaks sharply from the walls thereof along a line contact which extends substantially entirely around the inner surface of said passage.

3. The combination in a free discharge hydraulic valve mechanism comprising, a valve body having a passage therethrough, means forming a valve seat, a surface adjacent said seat but sharply angularly disposed to the path of fluid flow thereover thereby to form a sharply breaking edge to cause liquid flowing over said edge to sharply depart therefrom, and a movable valve element for controlling the flow of liquid through said passage, said valve element being provided with a sharply breaking edge formation extending across the flow surface of the valve in a direction transversely of the flow lines, whereby the liquid flowing through said valve issues from said passage as a free jet which sharply departs from said seat and from said valve element along a line contact which extends substantially entirely across the surface of said valve element in a direction transverse of the flow.

4. The combination in a free discharge hydraulic valve mechanism comprising, a valve body having a passage therethrough, means forming a valve seat, a surface adjacent said seat but sharply angularly disposed to the path of fluid flow thereover thereby to form a sharply breaking edge to cause liquid flowing over said edge to sharply depart therefrom, and a movable valve element for controlling the flow of liquid through said passage, said valve element being provided with a sharply breaking edge formation extending across the flow surface of the valve in a direction transversely of the flow lines, whereby the liquid flowing through said valve issues from said passage as a free jet which sharply departs from said seat and from said valve element along a line contact which extends substantially entirely across the surface of said valve element in a direction transverse of the flow, and said valve body being arranged so as to admit air freely and adjacent to the breaking edges of the valve and its body.

5. The combination in a free discharge hydraulic valve of the butterfly type comprising, a valve body having a passage therethrough of substantially cylindrical cross-section, a valve seat therein, and a valve disc rotatably supported in said passage, said body and valve disc being provided with sharply breaking edges extending across the flow surfaces of the body and disc in directions transversely of the flow lines, whereby the liquid in flowing thereover will sharply depart from the surfaces of the valve mechanism to form substantially free jets issuing on each side of the valve disc.

6. The combination in a free discharge hydraulic valve of the butterfly type comprising, a valve body having a passage therethrough of substantially cylindrical cross-section, a valve seat therein, and a valve disc rotatably supported in said passage, said body and valve disc being provided with sharply breaking edges extending across the flow surfaces of the body and disc in directions transversely of the flow lines, whereby the liquid in flowing thereover will sharply depart from the surfaces of the valve mechanism to form substantially free jets issuing on each side of the valve disc, said valve body having a portion which projects downstream beyond the axis of rotation of the valve disc, the cross-sectional area of said downstream body portion being materially larger than the cross-sectional area of the jets of water freely issuing on each side of the valve disc whereby air may freely flow adjacent to said breaking surfaces on both the valve body and disc.

7. The combination in a free discharge hydraulic valve mechanism of the butterfly type comprising a valve body having a passage of substantially cylindrical cross-section and provided with a sharply breaking edge, and a valve disc rotatably supported in said passage and having surfaces sharply offset from the flow surfaces of the disc to form a sharply breaking edge extending for substantially the full axial extent of the disc, whereby liquid freely issuing from said passage sharply departs from the valve mechanism at said edges.

8. The combination in a free discharge hydraulic valve mechanism of the butterfly type comprising a valve body having a flow passage of substantially cylindrical cross-section, said body being provided with a sharply breaking edge around the circumference of its flow surface, and a valve disc rotatably disposed in said passage and having a sharply breaking edge on its flow surfaces and in a direction transversely of the direction of the flow lines thereover, said breaking edges being disposed on each side of the disc adjacent its axis and extending substantially the full axial distance of said disc along substantially straight lines, whereby liquid discharges from said valve mechanism by sharply departing therefrom along said breaking edges.

9. The combination in a free discharge hydraulic valve mechanism of the gate valve type comprising a body having a flow passage therethrough and provided with a sharply breaking edge around substantially the whole of the inside wall of said passage, and a valve element movable into said passage in a direction transversely thereof for variably controlling fluid flow therethrough, substantially the whole of the entering edge of said movable element providing a sharply breaking edge, whereby liquid discharging from said passage sharply departs from said valve mechanism along said breaking edges without thereafter contacting with the valve.

OTTO V. KRUSE.